United States Patent
Aisemberg

(10) Patent No.: US 10,656,793 B2
(45) Date of Patent: May 19, 2020

(54) PROVIDING PERSONALIZED NOTIFICATIONS

(71) Applicant: Microsoft Technology Licensing, LLC, Redmond, WA (US)

(72) Inventor: Adrian Aisemberg, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 128 days.

(21) Appl. No.: 15/605,884

(22) Filed: May 25, 2017

(65) Prior Publication Data
US 2018/0341373 A1    Nov. 29, 2018

(51) Int. Cl.
| | |
|---|---|
| *G06F 3/0482* | (2013.01) |
| *H04L 12/58* | (2006.01) |
| *G06T 13/80* | (2011.01) |
| *G06F 3/0484* | (2013.01) |
| *G06Q 10/10* | (2012.01) |

(52) U.S. Cl.
CPC ........ *G06F 3/0482* (2013.01); *G06F 3/04847* (2013.01); *G06Q 10/10* (2013.01); *G06T 13/80* (2013.01); *H04L 51/24* (2013.01); *G06T 2200/24* (2013.01)

(58) Field of Classification Search
CPC ... H04L 51/24; G06F 3/0482; G06F 3/04847; G06T 13/80; G06T 2200/24
See application file for complete search history.

(56) References Cited

U.S. PATENT DOCUMENTS

| | | |
|---|---|---|
| 5,966,691 A | 10/1999 | Kibre et al. |
| 6,937,950 B2 * | 8/2005 | Cragun ................ G06Q 10/109 345/473 |
| 7,542,773 B2 | 6/2009 | Koch |

(Continued)

FOREIGN PATENT DOCUMENTS

| | | |
|---|---|---|
| EP | 2353259 B1 | 11/2013 |
| WO | 2005064895 A1 | 7/2005 |

OTHER PUBLICATIONS

Sherve, "Heart emoticon set", available: Mar. 1, 2016, http://www.sherv.net/hearts-emoticons.html, https://web.archive.org/web/20160301144140/http://www.sherv.net/hearts-emoticons.html (Year: 2016).*

(Continued)

*Primary Examiner* — Seth A Silverman
(74) *Attorney, Agent, or Firm* — Rainier Patents, P.S.

(57) ABSTRACT

A technique is described herein for providing a personalized notification to a recipient-user. In one approach, the technique involves: receiving an original message sent by a sender-user; selecting a notification type from a set of possible notification types based on at least a portion of the original message; and selecting one or more property values from one or more respective ranges of possible property values. The selected notification type and selected property value(s) define a recipient-instantiated (RI) notification. The technique then displays the RI notification on a user interface presentation of a recipient-user computing device. In one approach, the technique can randomly select the notification type and/or the property value(s). In addition, or alternatively, the technique can make these choices based on context information.

20 Claims, 8 Drawing Sheets

(56) References Cited

U.S. PATENT DOCUMENTS

| | | | |
|---|---|---|---|
| 8,601,371 B2 | 12/2013 | Dirks et al. | |
| 9,071,464 B2 | 6/2015 | Jacovi et al. | |
| 2003/0084109 A1 | 5/2003 | Balluff | |
| 2005/0143103 A1 | 6/2005 | Bjorgan et al. | |
| 2009/0019117 A1* | 1/2009 | Bonforte | G06Q 10/107 709/206 |
| 2010/0332483 A1* | 12/2010 | Brownell | G06F 16/4387 707/754 |
| 2011/0294525 A1* | 12/2011 | Jonsson | G06F 17/27 455/466 |
| 2012/0198002 A1 | 8/2012 | Goulart et al. | |
| 2014/0157193 A1 | 6/2014 | Moore | |
| 2014/0379813 A1 | 12/2014 | Charania et al. | |
| 2015/0100537 A1* | 4/2015 | Grieves | G06N 5/048 706/52 |
| 2016/0342571 A1* | 11/2016 | Lane | G06F 17/212 |
| 2018/0109639 A1* | 4/2018 | Skillman | H04L 67/26 |

OTHER PUBLICATIONS

"International Search Report and Written Opinion Issued in PCT Application No. PCT/US2018/029247", dated Aug. 13, 2018, 11 Pages.

Calore, Michael, "The 10 Coolest Features Coming to Windows 10," available at <<https://www.wired.com/2016/10/windows-10-creators-update-new-features/>>, Wired, Oct. 26, 2016, 5 pages.

"What are emoticons?," available at <<https://support.skype.com/en/faq/FA11046/what-are-emoticons?q=emoji>>, Skype product website, Microsoft Corporation, Redmond, WA, accessed on May 8, 2017, 4 pages.

Dellinger, AJ, "How to use Google Hangouts' secret emoji," The Daily Dot, Dec. 19, 2014, last updated Mar. 8, 2017, 9 pages.

Skillman, et al., "Tiered Notification Framework," U.S. Appl. No. 15/365,865, filed Nov. 30, 2016, 66 pages.

Aisemberg, Adrian, "Providing Notifications with Response Options," U.S. Appl. No. 15/605,882, filed May 25, 2017, 48 pages.

* cited by examiner

SENDER EXPERIENCE, APPLICATION SPECIFIC

PROVIDING PERSONALIZED NOTIFICATIONS

BACKGROUND

A recipient-user may receive multiple messages sent by sender-users in the course of a single day. In a typical interaction, the recipient-user, who operates a recipient computing device, may receive a notification that informs the recipient-user that an original message has been received. The recipient-user may then choose to click on the notification. That action activates a message-sending application, if not already activated. The recipient-user may then interact with the message-sending application to reply to the original message, or otherwise interact with the message.

While this technology is ubiquitous, it can lead to poor user experience in those circumstances in which the recipient-user receives a large number of messages. For instance, this technology can clutter the recipient-user's workspace with information that the recipient-user comes to regard as a distracting form of noise. As an ultimate consequence, this technology can potentially impede the user's efficient interaction with the recipient computing device.

SUMMARY

A technique is described herein for providing a personalized notification to a recipient-user. In one approach, the technique involves: receiving an original message sent by a sender-user; selecting a notification type from a set of possible notification types based on at least a portion of the original message; and selecting one or more property values from one or more respective ranges of possible property values. The selected notification type and selected property value(s) define a recipient-instantiated (RI) notification. The technique then displays the RI notification on a user interface presentation of a recipient-user computing device.

According to one illustrative aspect, the technique randomly selects the notification type and/or the property value(s). In addition, or alternatively, the technique can select the notification type and/or the property value(s) based on context information. For instance, the context information may describe: characteristics of the recipient-user as specified in a user profile; and/or a timing at which the RI notification is displayed to the recipient-user; and/or a location at which the RI notification is displayed to the recipient-user, etc.

According to one advantage, the technique increases the variety in a stream of notifications delivered to a particular recipient-user based on various factors. In some implementations, the technique can also leverage the context information to increase the relevance of the notifications sent to a particular recipient-user. The variety-increasing and relevance-increasing aspects of the technique can reduce the level of distraction posed by notifications, enabling the recipient-user to efficiently interact with his or her computing device.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
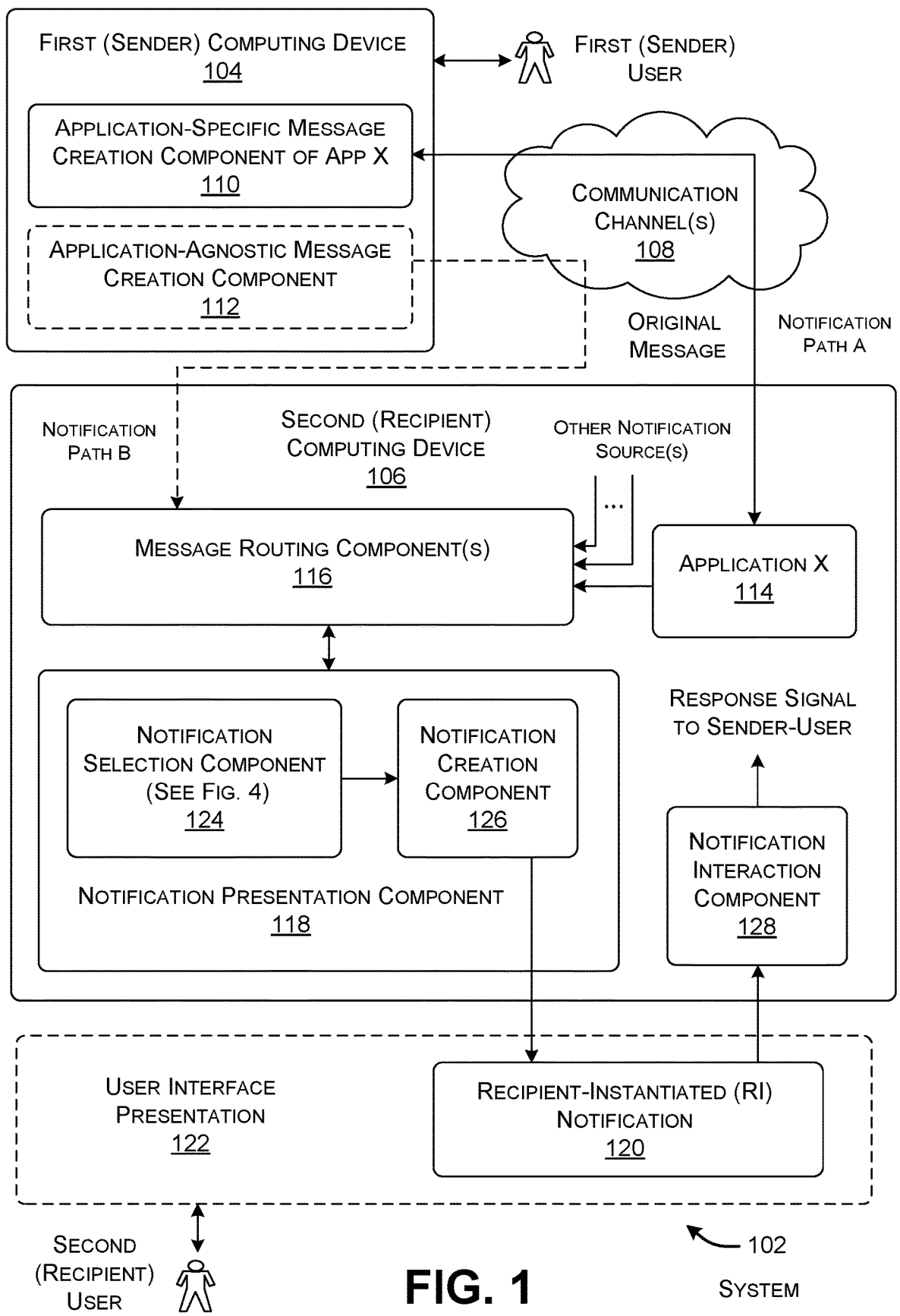
FIG. 1 shows an illustrative system which involves sending an original message from a sender computing device to a recipient computing device.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for providing personalized notifications to a recipient-user. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows an illustrative system 102 which involves sending an original message from a first (sender) computing device 104 to a second (recipient) computing device 106. More generally, the system 102 can include many more sender computing devices and recipient computing devices, although not shown.

The sender computing device 104 and the recipient computing device 106 can each correspond to any user computing device of any type, including, but not limited to: a stationary desktop computing device, a laptop computing device, any kind of handheld computing device (such as a smartphone or tablet-type computing device), a game console, a set-top box, a wearable computing device, a virtual-reality device, an augmented-reality device, etc., or any combination thereof. The sender computing device 104 interacts with the recipient computing device 106 via one or more communication channels 108, referred to in the singular below for brevity. The communication channel 108 may entail the use of a local area network, a wide area network (e.g., the Internet), one or more point-to-point links, etc., or any combination thereof.

FIG. 1 highlights the features of the sender computing device 104 that play a role in the creation and transmission of the original message. FIG. 1 also shows the features of the recipient computing device 106 that play a role in the receipt and processing of the original message. However, any computing device can function as a sending computing device in some circumstances and a recipient computing device in other circumstances. Thus, although not shown, the sender computing device 104 incorporates all of the features of the recipient computing device 106, and vice versa. Further, certain features described below as being performed by the sender computing device 104 can alternatively, or in addition, be performed by the recipient computing device 106, and vice versa.

As a further clarification, FIG. 1 shows that various components running on a particular computing device are entirely implemented by local functionality resident on that computing device. While this depiction indeed represents one implementation, in other cases, any portion of a local component can be implemented by remote computing functionality, such as a remote computing system (not shown) having one or more servers.

Referring first to the sender computing device 104, the sender-user can create an original message in different ways. In one approach, the sender-user can create the original message using any application, such as a communication-related application or social network-related application, etc. Such an application is referred to generically below as "application X." In this context, an application-specific message creation component 110 represents whatever functionality that the application X uses to create the message. Alternatively, the sender-user can create the original message using an operating system component. In this context, an application-agnostic message creation component 112 represents whatever functionality that the operating system component uses to create the message. As the name implies, the application-agnostic message creation component 112 creates the message without reliance on any particular application.

Now referring to the recipient computing device 106, the recipient computing device 106 may operate on the original message using different processing paths, depending on how it is created. In a first case, assume that the sender-user creates the original message using the application-specific message creation component 110, associated with application X. In that case, a counterpart recipient-side application X 114 installed on (or otherwise accessible to) the recipient computing device 106 receives the original message and then forwards it to a message routing component 116. The message routing component 116 then routes the original message to a notification presentation component 118. The notification presentation 118 generates a notification 120 based on the original message, and displays that notification 120 on a user interface presentation 122.

In a second case, assume that the sender-user creates the original message using the application-agnostic message creation component 112, which, as said, may correspond to an operating system component. In that case, the message routing component 116 may directly receive the original message via an operating system transport mechanism, without involving any application. The message routing component 116 then forwards the original notification to the notification presentation component 118.

The notification presentation component 118 includes a notification selection component 124 and a notification creation component 126. The notification selection component 124 performs the task of mapping the original message into a recipient-instantiated (RI) notification 120. In other words, there is a one-to-many relationship between the original message and a plurality of candidate notifications that can be generated based on the original message; the notification selection component 124 performs the task of mapping the original notification to one of the possible candidate notifications, referred to herein as the recipient-instantiated (RI) notification 120. The notification creation component 126 displays the RI notification 120 on the user interface presentation 122.

Finally, an optional notification interaction component 128 detects an input signal when (and if) the recipient-user interacts with the RI notification 120, such as by clicking on the RI notification 120. In response, the notification interaction component 128 can perform any environment-specific action, such as by opening the application X 114. The notification interaction component 128 can be implemented in various ways. In one case, the application X 114 implements at least part of the notification interaction component 128. In another case, an operating system component implements the notification interaction component 128.

Figure 2:
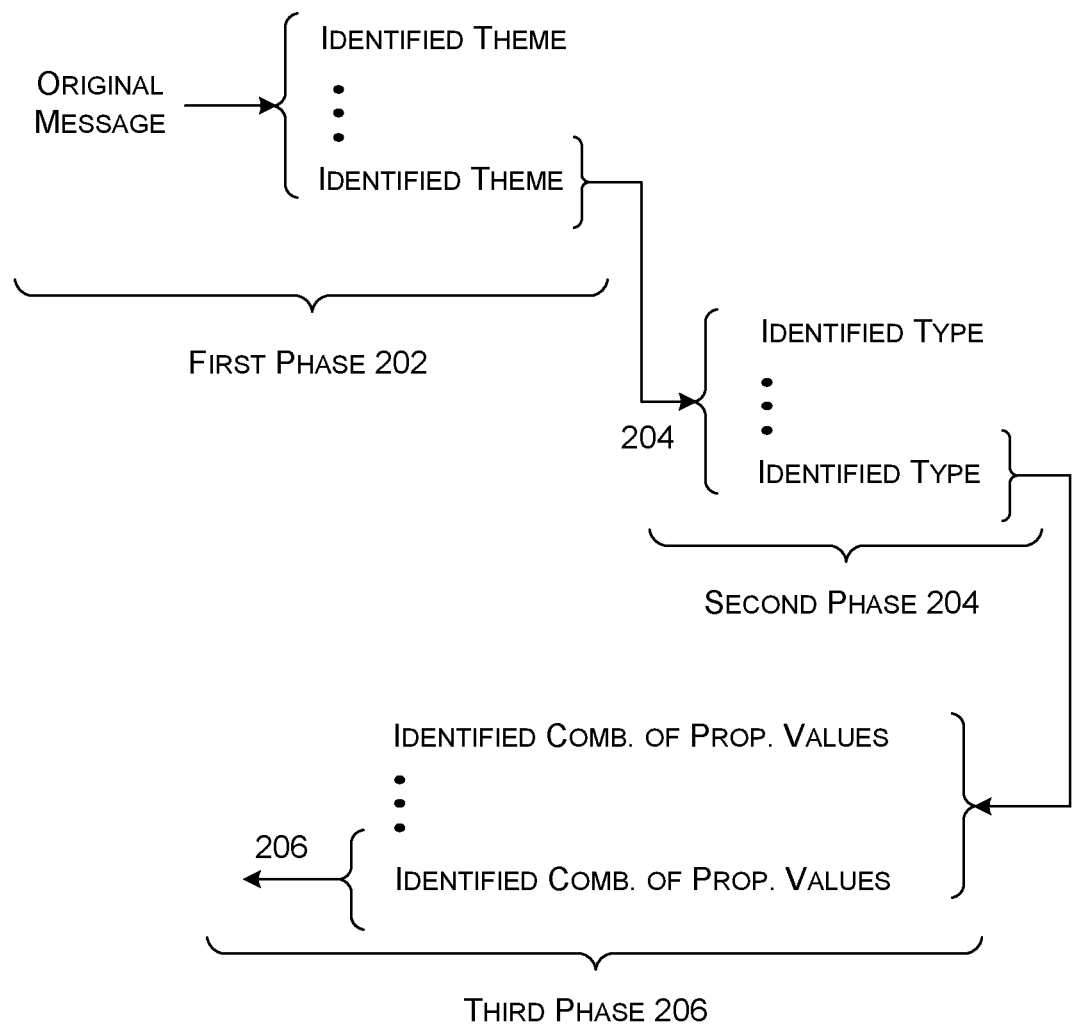
FIG. 2 shows an overview of a strategy for mapping an original message (sent by the sender computing device of FIG. 1) to a recipient-instantiated (RI) notification (that is received by the recipient computing device of FIG. 1).

FIG. 2 shows an overview of one illustrative and non-limiting computer-implemented strategy by which the notification selection component 124 (of the recipient computing device 106) maps the original message into a recipient-instantiated (RI) notification. In a first phase 202, the notification selection component 124 first maps at least one portion of the original message into a theme. For example, a predetermined lookup table can map different ideograms (e.g., emojis), text phrases, etc. into respective themes. For example, the lookup table can indicate that a heart-shaped static emoji maps to an "affection" category. Similarly, the lookup table can also indicate that the phrase "I love you" maps to the same category.

In some cases, a single original message contains information that maps to a single theme. In other cases, the original message contains information that maps to two or more themes. For example, a single message can include two static emojis or phrases that map to two different themes. In that case, the first phase 202 can optionally involve selecting a single theme associated with the original notification. In other implementations, the first phase 202 involves selecting two or more themes. But to initially simplify the explanation, assume that the first phase 202 involves mapping the original message to a single theme, such as "affection."

Assume that each theme, in turn, is associated with a set of notification types. For example, assume that the affection theme is associated with a set of animated (and/or static) emojis that contain one or more hearts, or which otherwise pertain to the theme of affection. For instance, a first animated emoji may depict a stream of hearts which emanates from a source point, resembling rising balloons or bubbles. A second animated emoji may depict a beating heart. A third animated emoji may depict a heart that grows in size. A fourth animate emoji may depict a cupid-like figure shooting an arrow into a heart, and so on. In a second phase 204, the notification selection component 124 chooses one of these notification types, such as the animated emoji that depicts a stream of hearts (referred to as a "bubbling heart emoji" below for brevity).

Assume that a selected notification type includes an appearance and/or a behavior that is governed by one or more properties. For example, with respect to the bubbling heart emoji, a first property determines a number of hearts that are present in the stream of hearts. A second property determines a color of the hearts in the stream of hearts. A third property determines a type of motion that the hearts exhibit in the stream of hearts. A fourth property determines an amount of time that the notification creation component 126 presents the bubbling heart emoji on the user interface presentation 122. A fifth property determines a size of a window that the notification creation component 126 uses to display the bubbling heart emoji, and so on. As will be appreciated, the above list of possible properties is cited by way of example, not limitation; other environments can define a notification type using any other set of properties. Each such property can assume different property values within a range of possible property values, where that range may correspond to a continuous numeric range or a set of discrete possibilities. In a third phase 206, the notification selection component 124 chooses one or more property values for the set of properties associated with the bubbling heart emoji.

The notification selection component 124 can apply one or more strategies in making the selections associated with the first phase 202, second phase 204, and third phase 206. For example, in one case, the notification selection component 124 can use a computer-implemented random number generator to select among a set of possible choices in each stage. For example, in the case in which an original message maps to plural themes, the first phase 202 can involves randomly selecting one of the themes. The second phase 204 can then involve randomly selecting a notification type from the set of notification types associated with the selected theme. The third phase 206 can then involve randomly selecting each property value associated with the selected notification type, such as by randomly selecting a number of hearts in the bubbling heart emoji.

In another case, the notification selection component 124 can make its selection in each stage based on context information. The context information includes a set of contextual factors that describe different respective aspects of the circumstance in which a notification is to be presented to the recipient-user. The contextual factors can include, but are not limited to, any of: information regarding the particular recipient-user; information regarding a time at which the notification is to be delivered; information regarding a place at which the notification is to be delivered; information regarding the recipient computing device 106 on which the notification is to be displayed; information regarding a level of importance associated with the notification; information regarding whether the recipient-user is currently interacting with the recipient computing device 106, and so on. The information regarding the recipient-user, in turn, can include, but is not limited to: information regarding the preferences of the recipient-user; information regarding a relationship between the recipient-user and the sender-user; any demographic characteristic(s) of the recipient-user, and so on.

The notification selection component 124 can leverage the context information in different ways. Consider a task, stated in generic terms, that involves mapping a set of contextual factors to a selection among a set of possible choices. In one approach, the notification selection component 124 can apply one or more predetermined rules that map the contextual factors to a selection of one of the possible choices. The rule can be expressed in an IF-THEN format, and/or can embody any other logical structure. For example, a rule can specify that IF the recipient-user's location is X and the current time is Y, THEN the notification selection component 124 should select choice Z. Another rule can specify that IF the recipient-user's calendar indicates that a certain event X is occurring on the current day, THEN the notification selection component 124 should select choice Y. Another rule can specify that IF the sender-user has a prescribed relationship X with the recipient-user, THEN the notification selection component 124 should select a choice Y, and so on.

In another approach, for each contextual factor, and for each candidate choice, the notification selection component 124 can add an incremental positive weight value to the choice when the contextual factor favors the choice, and an incremental negative weight value to the choice when the contextual factor disfavors the choice. Once all the contextual factors are considered, the notification selection component 124 can select the choice having the highest net score.

In another approach, the notification selection component 124 uses a machine-trained model to map a feature vector into a score for reach choice. The feature vector describes the contextual factors, and, optionally, other data. The notification selection component 124 can then choose the score having the highest value (or, more generally, the most favorable value). The machine-trained model can correspond to a logistical regression model, a neural network model, etc.

In yet another implementation, the notification selection component 124 can use both random selection and context information in any of the above-described three phases (202, 204, 206). For example, in one approach, the notification selection component 124 can use random selection for one or more phases, and use context information for one or more other phases.

In another approach, the notification selection component 124 can apply both a random number generator and context information in a single phase. For example, the notification selection component 124 can use the context information to select a subset of appropriate choices, and then use a random number generator to select one choice from among the subset of choices. For example, the notification selection component 124 can select a subset of the notification types that are deemed suitable based on the prevailing contextual factors. The notification selection component 124 can then randomly select a notification type from among this subset.

In another approach, the notification selection component 124 can bias each choice based on context information, and then use a random number generator to select among the biased choices. The notification selection component 124 can bias a choice in any manner, such as increasing a number n of instances of a choice in a set of choices depending on its context-assessed appropriateness. This will have the effect of increasing the probability that the random number generator will choose that choice.

In another approach, the notification selection component 124 can use a machine-trained model to map a feature vector into a score for each choice, where that feature vector can incorporate both context-based information and randomized values. Alternatively, or in addition, the machine-trained model itself can be trained to achieve a desired degree of randomization in its operation.

The notification selection component 124 can use yet other strategies to select an RI notification. Further note that the notification selection component 124 need not make the above-described three selections in the serial manner described above. In other cases, the notification selection component 124 can make the three selections in a different order compared to that described above, such as by choosing property values prior to selecting a notification type. In yet another case, the notification selection component 124 can condense two or more selection phases into a single phase.

In yet another variation, the notification selection component 124 can select two or more RI notifications for a single original message. For example, in the first phase 202, the notification selection component 124 may conclude that the original message maps to two or more themes. If so, the notification selection component 124 can generate an RI notification for each such theme. The notification creation component 126 can display the two or more RI notifications at the same time, or in sequence. Or it can select a single RI notification to display.

Figure 3:
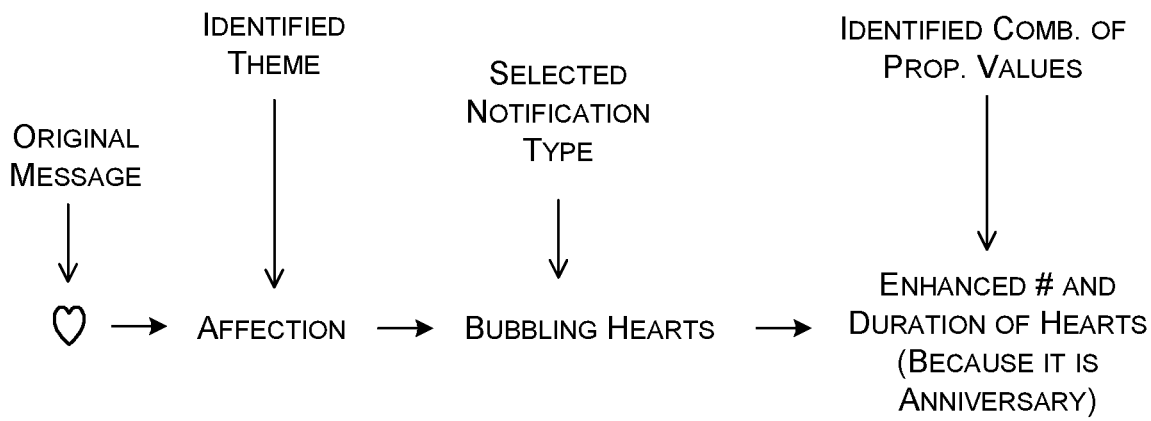
FIG. 3 shows an example of the strategy of FIG. 2.

FIG. 3 shows an example of the strategy of FIG. 2. Assume that the sender-user and the recipient-user correspond to a husband and wife, respectively. Further assume that the husband sends an original message to the wife that consists of a single emoji that depicts a static heart. Further assume that the husband sends the emoji on the husband's and wife's anniversary date. Finally, assume that the wife generally prefers not to receive intrusive notifications that flood her computer screen, but makes an exception for important messages that are sent by close family members.

In the first phase 202, assume that the notification selection component 124 uses a lookup table to map the single emoji to the theme of affection, which, in turn, is associated with a set of notification types. Note that there is no need in this example to choose among plural themes, because the original message maps to a single theme.

In the second phase 204, assume that the notification selection component 124 randomly selects the bubbling heart emoji from a set of notification types. In the third phase 206, assume that the notification selection component 124 chooses a high value for a number of hearts to be displayed in the stream of bubbling hearts, relative to a default number of hearts. Further, assume that the notification selection component 124 increases a length of time at which the bubbling heart emoji appears on the user interface presentation 122, relative to a default amount of time. The notification selection component 124 makes these choices based on two pieces of contextual information: the fact the sender-user and the recipient-user are related by marriage, and, more importantly, the fact that the sender-user is sending the recipient-user a message relating to affection on their anniversary date. This mapping logic can be incorporated in one or more discrete rules, an algorithm, a machine-trained model, etc. The wife's preference indicates that it is permissible to display the notification to the wife, but this would not be the case had someone outside the wife's close inner circle sent the same emoji.

In general, the system 102 departs from other notification platforms in a number of respects. In other notification platforms, the original message specified by the sender-user completely specifies the notification that is presented to the recipient user, regardless of the identity of the recipient user and other contextual factors associated with the presentation of the notification. In other words, in these systems, there is a one-to-one relationship between a message and a notification. In contrast, the system 102 of FIG. 1 maps the original message created by the sender-user into a context-dependent notification for consumption by a particular recipient-user. As such, a sender-user can send the same original message to N recipient-users, and the N recipient-users can potentially receive different respective RI notifications. Those notifications relate to the original notification, but are otherwise different. For example, a person can send the same static heart emoji to his sister, wife, and a daughter. These three people will likely receive different RI notifications based on their different relationships with the sender-user and/or based on other person-specific contextual factors.

Overall, the system 102 increases the variety of notifications that a recipient-user receives, and also increases the relevance of those notifications. This has the effect of reducing the potential that the recipient-user will regard the notifications as noise-like visual clutter. This has the further consequence of reducing the extent to which the notifications will interfere with the tasks being performed by the recipient-user. To cite one example of this benefit, a recipient-user can create a preference that instructs the notification selection component 124 to accept intrusive notifications for only a narrow class of circumstances. An example of an intrusive notification may correspond to an emoji that float across the recipient user's computer screen. Otherwise, the recipient-user instructs the notification selection component 124 to present minimally intrusive notifications. This behavior overall reduces the disruption to the recipient-user's workflow caused by notifications.

Figure 4:
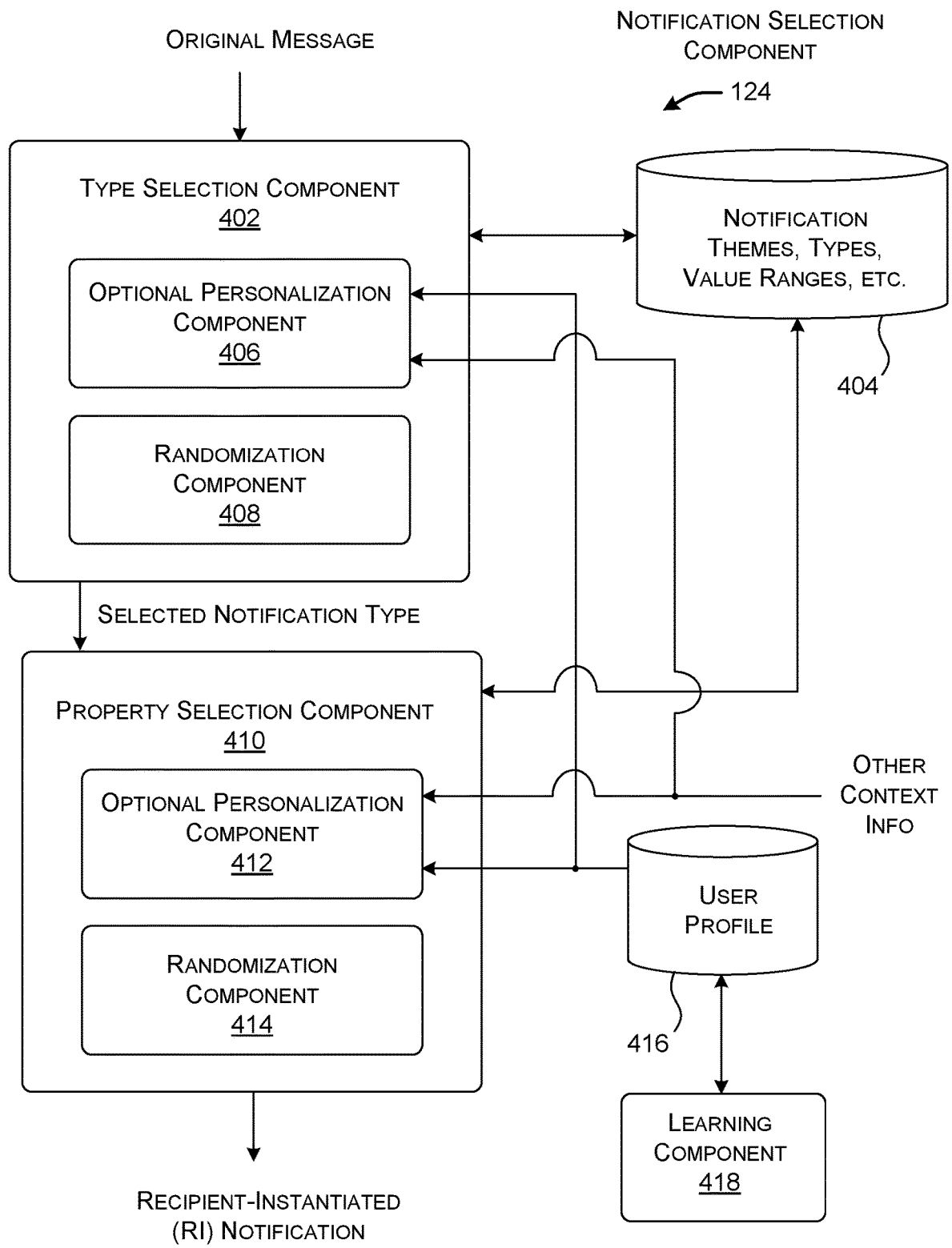
FIG. 4 shows one implementation of a notification selection component, which is an element of the recipient computing device of FIG. 1.

FIG. 4 shows one implementation of the notification selection component 124. The notification selection component can include a type selection component 402 that maps the original message into a notification type. In some implementations, that mapping, in turn, can include a first phase that maps the original message into a theme, and a second stage that selects a notification type from among a plurality of notification types associated with the theme. The type selection component 402 performs this task based on information provided in a data store 404. That is, the data store 404 stores information regarding the association between characters (including ideograms) and phrases that may appear in an original message and themes associated therewith. The data store 404 also stores information regarding the association between each theme and a set of notification types that pertain to the theme. In one approach, the data store 404 can be structured as a lookup table.

The type selection component 402 can include a personalization component 406 and a randomization component 408. The personalization component 406 leverages context information in making choices among options. The randomization component 408 uses a random number generator to make choices among options. The personalization component 406 and the randomization component 408 can use any of the strategies described above in the explanation of FIG. 2. As further explained above, the type selection component 402 can use either the personalization component 406 or the randomization component 408 in making a selection, or both the personalization component 406 and the randomization component 408.

A property selection component 410 chooses one or more property values for the notification type that has been selected by the type selection component 402. More specifically, the data store 404 can store information that describes a range of values associated with each property of each notification type, where that range can be expressed as a continuous numeric range or a set of discrete choices. The property selection component 410 chooses a property value for each property of the selected notification type within the range specified in the data store 404.

The property selection component 410 can perform its selection operation using a personalization component 412 and/or a randomization component 414. These two components can apply any of the strategies described above in the context of the explanation of FIG. 2.

The personalization components (406, 412) can perform their functions based on a user profile (associated with the recipient-user), as stored in a data store 416. A learning component 418, in turn, can produce the user profile associated with the recipient-user. The personalization components (406, 412) can receive other context information received from other sources. Such other sources can include, but are not limited to: a time-determining mechanism (e.g., a digital clock); a position-determining mechanism (e.g., a Global Positioning System mechanism, a beacon-based location mechanism, a triangulation-based location mechanism, etc.); a calendar system; a weather-reporting information feed; a general news feed, etc.

The learning component 418 can compile the user profile in different ways. For example, the learning component 418 can consult a user contact store or a relationship graph to determine the relationship between the recipient-user and other users. The learning component 418 can collect preference information based on preferences explicitly specified by the recipient-user and/or based on patterns that have been detected in the behavior of the recipient-user over a span of time. Similarly, the learning component 418 can identify the demographic characteristics of the recipient-user based on personal information explicitly specified by the recipient-user and/or based on user characteristics that are inferred from the detected habits of the recipient-user (such as online selections made by the recipient-user). The learning component 418 can determine trends in behavior based on any strategy, such as by counting incidents of different kinds of behavior exhibited by the recipient-user, and/or by applying a machine-learned model to interpret the behavior of the recipient-user, etc.

In some implementation, if authorized, the learning component 418 can also consult a user profile associated with the sender-user, or other information pertaining to the sender-user. The learning component 418 can then compare the known characteristics of the recipient-user with the sender-user's characteristics (e.g., as revealed by the sender-user's user profile). This comparison potentially yields additional insight beyond that conveyed by the recipient-user's contact store or social graph. For example, the comparison may reveal that both the sender-user and the recipient-user belong to the same organization and/or share certain interests, etc.

Figure 5:
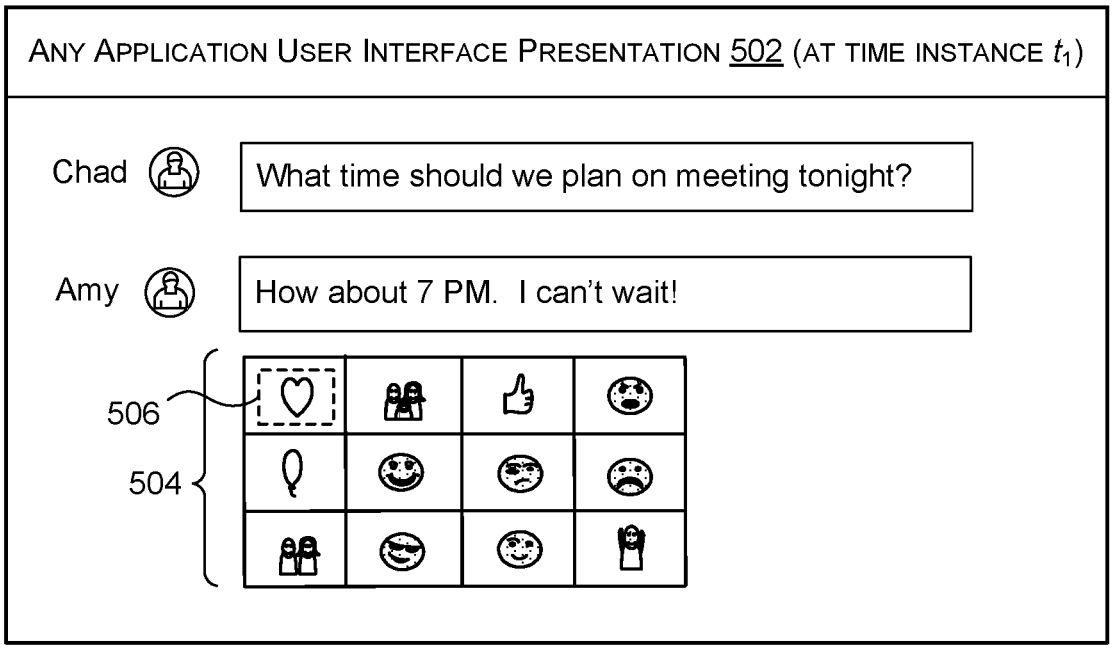
FIG. 5 shows illustrative user interface presentations provided to a sender-user via the sender computing device of FIG. 1.
Figure 5:
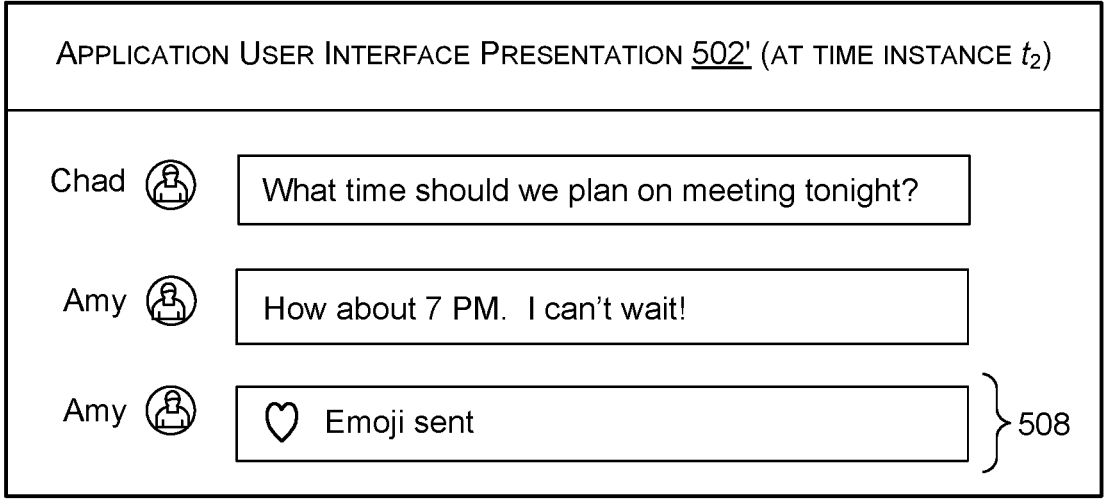

Advancing to FIG. 5, this figure shows an application-specific manner by which a sender-user can create an original message to be sent to a recipient-user, e.g., corresponding to use of the application-specific message creation component 110 of FIG. 1. More specifically, assume in this example that a sender-user (a person named Amy) is in the process of chatting with a recipient user (a person named Chad) using a particular application, such as the generic application X mentioned with respect to FIG. 1. FIG. 5 shows user interface presentations provided by the application X.

More specifically, the top portion of FIG. 5 shows a user interface presentation 502 that appears to the sender-user Amy at a time $t_1$. At this time, the sender-user activates a panel 504 of static emojis (e.g., by clicking on an activation link), and chooses a static heart emoji 506 from the panel 504. The bottom portion of FIG. 5 shows the user interface presentation 502' at time t₂, after the static emoji 506 has been selected. The user interface presentation 502' includes a message field 508 which informs the sender-user that an original message has been sent to the recipient-user, where that original message specifies the static heart emoji 506.

Figure 6:
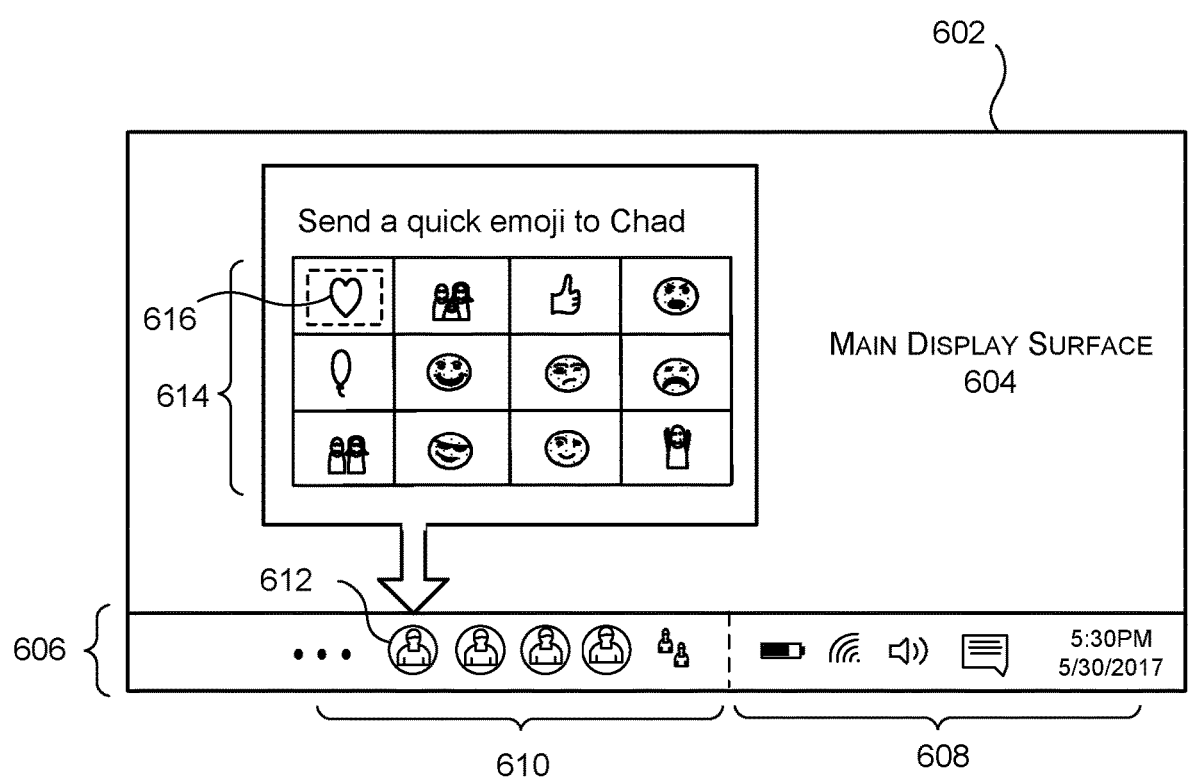
FIG. 6 shows an alternative user interface presentation provided to the send-user.

FIG. 6 shows an application-agnostic manner by which the sender-user can create an original message to be sent to a recipient-user, e.g., corresponding to use of the application-agnostic message creation component 112 of FIG. 1. More specifically, FIG. 6 shows a user interface presentation 602 generated by the operating system of the sender computing device 104. For example, the user interface presentation 602 may correspond to a home screen provided by the operating system of the sender computing device 104. For instance, the user interface presentation 602 may represent the graphical desktop of a personal computing device, or the start screen of a mobile computing device (e.g., a smartphone), etc.

The user interface presentation 602 can include a main display surface 604 and at least one task bar 606. The task bar 606 is positioned at the periphery of the main display surface 604, such as at the bottom of the main display surface 604. In other implementations, the task bar 606 appears in another part (or parts) of the user interface presentation 602 with respect to the main display surface 604. In other implementations, the user interface presentation 602 includes some other type(s) of task-related region(s) or graphical control/notification mechanism(s), instead of, or in addition to, a task bar.

The task bar 606 itself includes plural portions dedicated to displaying different kinds of information. A system tray portion 608 uses a set of system icons to convey general information regarding the status of the sender computing device 104, such as the battery level, network connection status, speaker device status, etc. of the sender computing device 104. The sender-user can control various aspects of the sender computing device 104 by interacting with the system icons shown in the system tray portion 608.

A people portion 610 displays a set of person indicators associated with respective people who have an established relationship with the sender-user (as defined by the sender-user). At any time, the sender-user can interact with the people-portion control component (not shown) to select the set of people. Thereafter, a people-portion (PP) control component (not shown) "pins" person indicators associated with these people to the people portion 610 of the task bar 606. As shown in FIG. 6, each person indicator may include information which identifies a particular person, such as a digital photograph of the particular person, an avatar associated with the particular person, a symbol associated with the particular person, etc.

Generally, the people portion 610 provides a convenient mechanism that allows the sender-user to interact with individuals associated with the displayed person indicators. For example, in the scenario shown in FIG. 6, the sender-user (Amy) has clicked on a person indicator 612 associated with a particular recipient user (Chad). In response, the PP control component activates a panel 614 of available emojis. Assume that the sender-user chooses the static heart emoji 616. In response, the sender computing device 104 transmits an original message to the recipient computing device 106 which conveys the static heart emoji 616. The operating system of the sender computing device may create and transmit the original message without involving any application.

Figure 7:
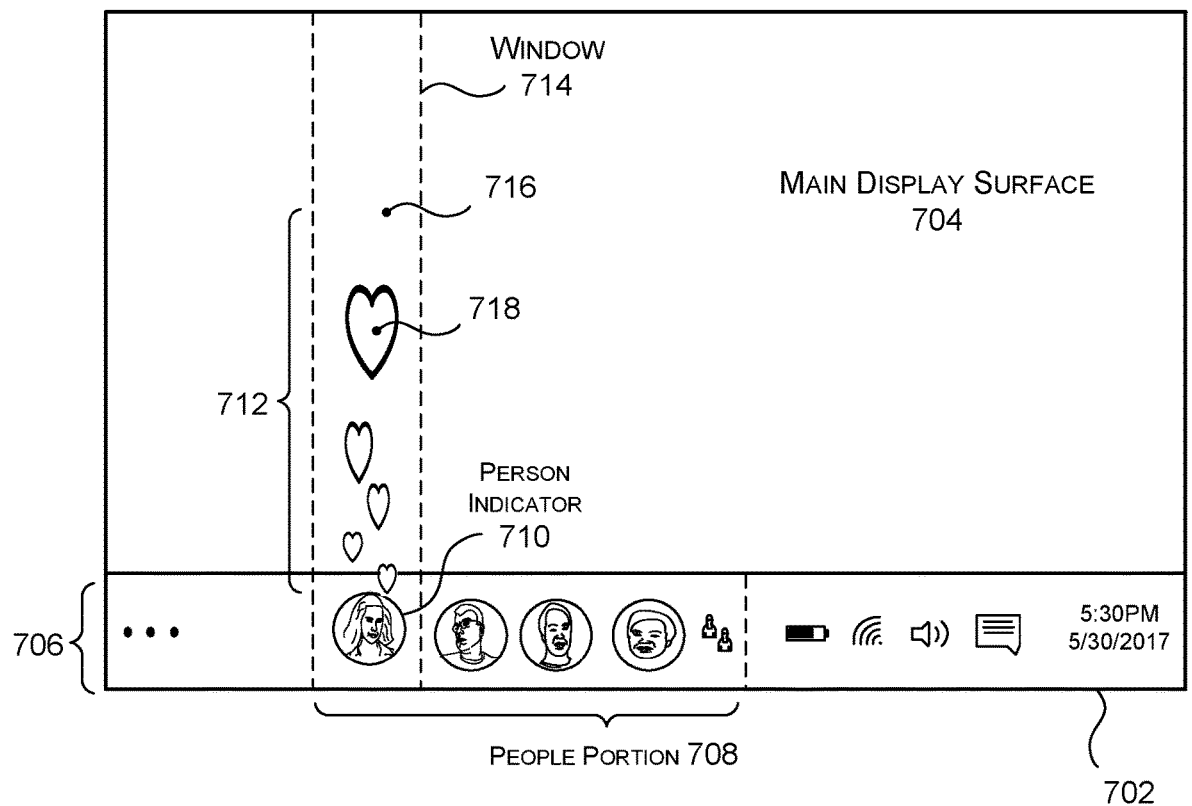
FIG. 7 shows an illustrative user interface presentation provided to a recipient-user via the recipient computing device of FIG. 1.

FIG. 7 shows a user interface presentation 702 that is presented to the recipient-user by the recipient computing device 106, in response to the original message that was sent by the sender-user, per the actions shown in FIG. 5 or 6. The user interface presentation 702 includes the same layout as the example of FIG. 6, but is presented to the recipient-user (Chad), rather than the sender-user (Amy). That is, the user interface presentation 702 includes a main display surface 704 and a task bar 706 having a people portion 708. Assume that the people portion 708 includes a person indicator 710 associated with the sender-user (Amy) who sent the original message to Chad, that original message consisting of a static heart emoji.

Assume in this case that the notification selection component 124 maps the original message to the above-described bubbling heart emoji, which is defined with respect to a set of property values. The notification presentation component 118 displays this notification 712 above the person indicator 710 associated with the sender-user, Amy. The implementation of FIG. 7 is advantageous because it allows the recipient-user to efficiently receive and interact with the original message, that is, without necessarily opening the application X through which the sender-user has sent the original message. The animated notification 712 can be implemented in different ways, e.g., as an animated Graphics Interchange Format (GIF) content item, an Animated Portable Network Graphics (APNG) content item, etc.

In some implementations, the notification presentation component 118 creates the experience shown in FIG. 7 by presenting a window 714 that has been allocated, in advance, for use in showing notifications associated with the person indicator 710. The window 714 can have any shape, position, dimensions, and behavior. In some implementations, the window 714 corresponds to a ribbon which extends from the person indicator 710 to the top of the user interface presentation 702; that ribbon has a horizontal extent which at least spans the width the person indicator 710. Although not shown, the notification presentation component 118 can allocate other windows to other respective person indicators in the people portion 708. Each such window can take the form of a ribbon which extends up from an associated person indicator to the top of the user interface presentation 702. Generally note that the display surface defined by any such window extends beyond the boundary associated with the task bar 706, thereby accommodating a notification experience which "bleeds" outside the bounds of the task bar 706.

The window 714 presents the notification 712 on a transparent background. The transparent background reveals whatever content is provided on a display surface which lies beneath the window 714. Further, the notification interaction component 128 is configured to pass any clicks (or other actions, such as taps) that the recipient-user directs to the transparent background to a display surface which lies beneath the transparent background. For instance, assume that the notification presentation component 118 detects that the recipient-user clicks on a point 716 in the window 714 that corresponds to part of the transparent background of the window 714 (rather than the notification 712 itself). In response, the notification interaction component 128 can direct the user's input action to whatever display surface lies beneath that point, for processing by any event handler associated therewith. In contrast, assume that the notification interaction component 128 detects that the recipient-user clicks on a point 718 on the bubbling heart emoji itself. In response, the notification interaction component 128 can perform an environment-specific task, such as by opening an application that has been used to create the original message (if any).

Other windows can have other dimensions and/or other behaviors compared to window 714 shown in FIG. 7. For example, in another case, the window 714 can have a height dimension that does not reach to the top of the user interface presentation 702. In another case, the window 714 has a width that spans plural person indicators, such that the respective windows associated with different sender-users overlap in the manner described above. Indeed, the notification presentation component 118 can display the content of a notification (associated with a particular sender-user) on a window that encompasses the entire display surface of the user interface presentation 702. This means that the notification presentation component 118 can display notifications for the sender-user anywhere in the user interface presentation 702, while still conveying a graphical nexus between each notification and the sender-user's person indicator, e.g., by showing the notification flowing out of or into the person indicator.

In other implementations, the notification presentation component 118 behaves as described above, but the person indicators can appear in any other part(s) of the user interface presentation 702 besides, or in addition to, the task bar 706.

In still other implementations, the notification presentation component 118 can display a notification in such a manner that it conveys an association with a person indicator, but the person indicator no longer has a fixed position within the user interface presentation 702. For example, the notification presentation component 118 can display the notification along with an associated person indicator at any position within the user interface presentation 702, and that position can change over time.

In still other implementations, the notification presentation component 118 can display a notification in a display region associated with the sender of the notification, but without also displaying a person indicator associated with that sender-user. For example, assume that the upper left quadrant of the user interface presentation 702 is associated with a particular sender-user. The recipient-user may interpret a notification that is presented in the upper left quadrant as originating from the particular sender-user, without being explicitly informed by the notification presentation component 118 of this association. Hence, a "person indicator," as the term is broadly used herein, can refer to any aspect of the user interface presentation 702 that is associated with a sender-user, not necessarily an explicit icon, picture, avatar, etc.

Figure 8:
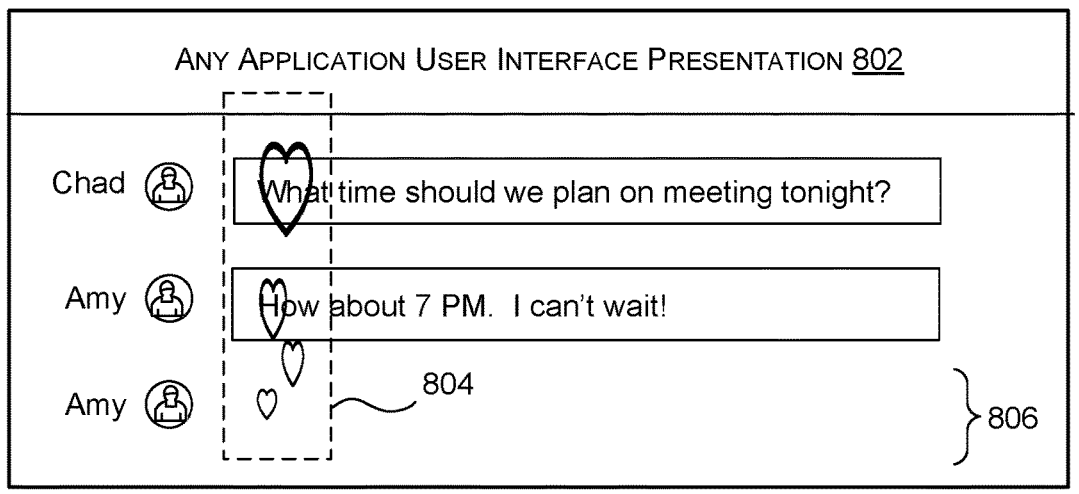
FIG. 8 shows an alternative user interface presentation provided to the recipient-user.

FIG. 8 shows a user interface presentation 802 provided to the recipient-user, which differs from the recipient experience shown in FIG. 7. In this case, the notification presentation component 118 works in conjunction with the application X 114 to provide the user interface presentation 802. The user interface presentation 802 shows the current state of a dialogue between the sender-user (Amy) and the recipient-user (Chad). The user interface presentation 802 displays a bubbling heart notification 804 in a field 806. That placement conveys the fact that the notification originates from a message sent by the sender-user, Amy. More specifically, while the notification 804 may originate from the field 806, the notification 804 may also bleed into other parts of the user interface presentation 802, and potentially outside the bounds of the user interface presentation 802. The application X can present the notification 804 using a transparent window having the same properties as the window 714 described in the context of FIG. 7.

The user interface presentations shown in FIGS. 5-8 are cited by way of example, not limitation. Other implementations can present yet other kinds of user interface presentations to the sender-user and the recipient-user.

B. Illustrative Processes

Figure 9:
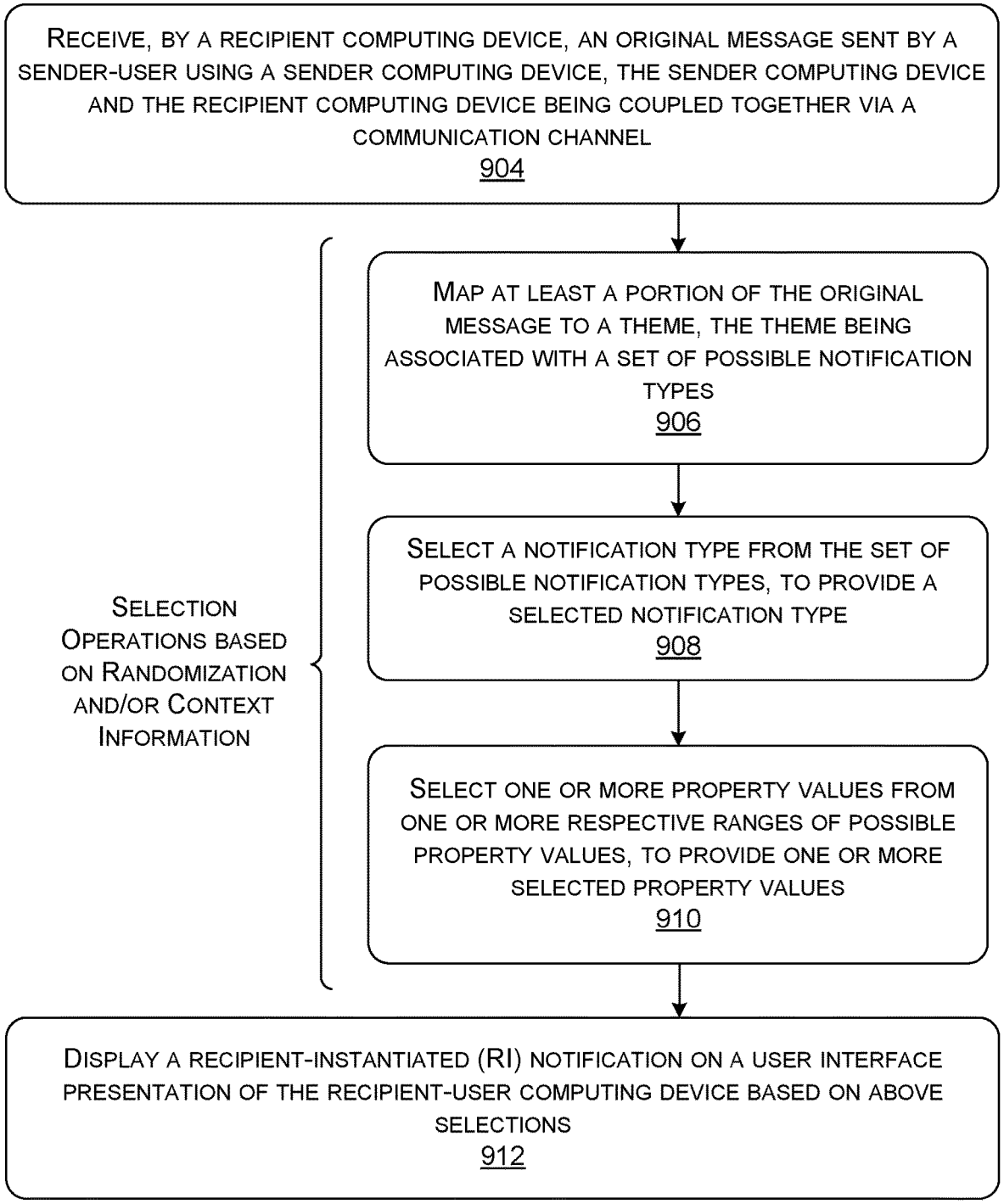
FIG. 9 shows an illustrative process that explains one manner of operation of the recipient computing device of FIG. 1.

FIG. 9 shows a process 902 that explains the operation of the system 102 of Section A in flowchart form. Since the principles underlying the operation of the system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 904, the recipient computing device 106 receives an original message sent by a sender-user using the sender computing device 104, wherein the sender computing device 104 and the recipient computing device 106 are coupled together via a communication channel 108. In block 906, the recipient computing device 106 maps at least a portion of the original message to a theme. In block 908, the recipient computing device 106 selects a notification type from a set of possible notification types that are associated with the theme, to provide a selected notification type. In block 910, the recipient computing device 106 selects one or more property values from one or more respective ranges of possible property values, to provide one or more selected property values. Altogether, the selected notification type and the selected property value(s) correspond to a recipient-instantiated (RI) notification. The recipient computing device 106 can perform the selection of the notification type and/or the selection of the property value(s) based on random selection and/or based on context information. In block 912, the recipient computing device 106 displays the RI notification on its user interface presentation 122.

C. Representative Computing Functionality

Figure 10:
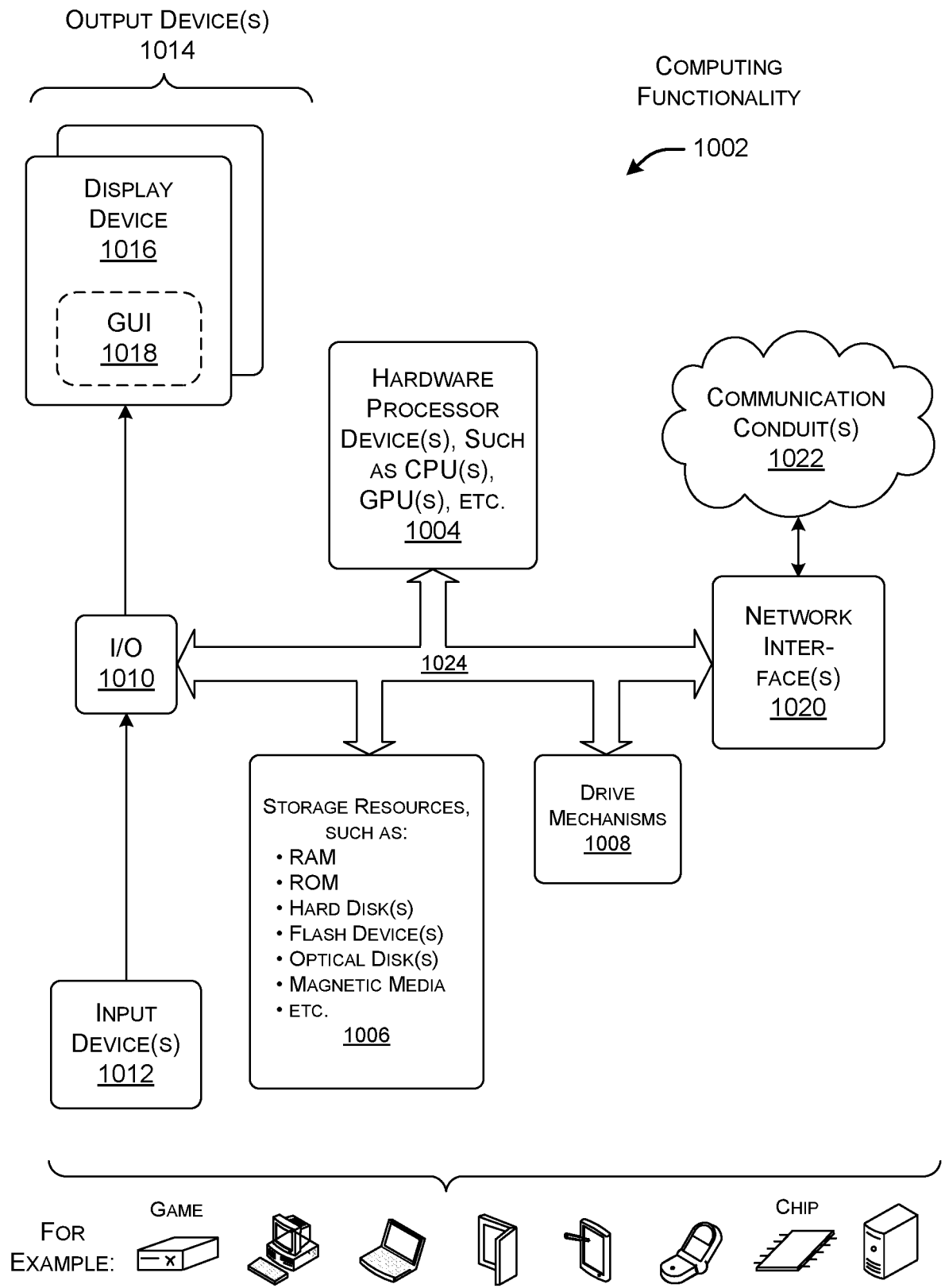
FIG. 10 shows illustrative computing functionality that can be used to implement any aspect of the features shown in the foregoing drawings.

FIG. 10 shows computing functionality 1002 that can be used to implement any aspect of the mechanisms set forth in the above-described figures. For instance, the type of computing functionality 1002 shown in FIG. 10 can be used to implement the sender computing device 104 or the recipient computing device 106, etc. In all cases, the computing functionality 1002 represents one or more physical and tangible processing mechanisms.

The computing functionality 1002 can include one or more hardware processor devices 1004, such as one or more central processing units (CPUs), and/or one or more graphics processing units (GPUs), and so on. The computing functionality 1002 can also include any storage resources (also referred to as computer-readable storage media or computer-readable storage medium devices) 1006 for storing any kind of information, such as machine-readable instructions, settings, data, etc. Without limitation, for instance, the storage resources 1006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1002. The computing functionality 1002 may perform any of the functions described above when the hardware processor device(s) 1004 carry out computer-readable instructions stored in any storage resource or combination of storage resources. For instance, the computing functionality 1002 may carry out computer-readable instructions to perform each block of the process 902 described in Section B. The computing functionality 1002 also includes one or more drive mechanisms 1008 for interacting with any storage resource, such as a hard disk drive mechanism, an optical disk drive mechanism, and so on.

The computing functionality 1002 also includes an input/output component 1010 for receiving various inputs (via input devices 1012), and for providing various outputs (via output devices 1014). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1016 and an associated graphical user interface presentation (GUI) 1018. For instance, the display device 1016 can display the user interface presentations shown in FIGS. 5-8. The display device 1016 may correspond to a liquid crystal display device, a cathode ray tube device, a projection mechanism, etc. Other output devices include a printer, one or more speakers, a haptic output mechanism, an archival mechanism (for storing output information), and so on. The computing functionality 1002 can also include one or more network interfaces 1020 for exchanging data with other devices via one or more communication conduits 1022. One or more communication buses 1024 communicatively couple the above-described components together.

The communication conduit(s) 1022 can be implemented in any manner, e.g., by a local area computer network, a wide area computer network (e.g., the Internet), point-to-point connections, etc., or any combination thereof. The communication conduit(s) 1022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1002 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself The following summary provides a non-exhaustive list of illustrative aspects of the technology set forth herein.

According to a first aspect, a method is described for providing a notification. The method includes: receiving, by a recipient computing device, an original message sent by a sender-user using a sender computing device, the sender computing device and the recipient computing device being coupled together via a communication channel; selecting (by the recipient computing device) a notification type from a set of possible notification types based on at least a portion of the original message, to provide a selected notification type; and selecting (by the recipient computing device) one or more property values from one or more respective ranges of possible property values, to provide one or more selected property values. The selected notification type and the selected property value(s) correspond to a personalized recipient-instantiated (RI) notification that represents a computer-generated transformation of the original message sent by sender computing device. The selecting of the notification type and/or the selecting of the property value(s) including random selection. The method further includes displaying the RI notification on a user interface presentation on a display device of the recipient-user computing device.

According to a second aspect, the RI notification is an animated presentation.

According to a third aspect, a portion of the original message that is used to select the notification type is a static ideogram.

According to a fourth aspect, a portion of the original message that is used to select the notification type is a text phrase.

According to a fifth aspect, the method further includes mapping the portion(s) of the original message to a theme, wherein the set of possible animated items types is associated with the theme.

According to a sixth aspect, the selecting of the notification type and/or the selecting of the property value(s) is also performed based on context information that describes a current context in which the RI notification is to be presented to the recipient-user.

According to a seventh aspect, the current context is based, at least in part, on characteristics of the recipient-user as specified in a user profile.

According to an eighth aspect, the user profile describes: a relationship of the sender-user to the recipient-user; and/or one or more preferences of the recipient-user with respect to the presentation of notifications to the recipient-user; and/or one or more demographic characteristics of the recipient-user.

According to a ninth aspect, the current context relates to, at least in part: a timing at which the RI notification is displayed to the recipient-user; and/or a location at which the RI notification is displayed to the recipient-user; and/or a level of importance associated with the RI notification; and/or an indication of whether the recipient-user is currently interacting with the recipient computing device.

According to a tenth aspect, the user interface presentation includes portions associated with different respective sender-users, and wherein the displaying operation involves displaying the RI notification in positional association with a portion of the user interface presentation associated with the sender-user who sent the original message.

According to an eleventh aspect, the original message is created by the sender-user using a particular application, and the displaying involves displaying the RI notification without opening the particular application.

According to a twelfth aspect, a recipient computing device is described. The recipient computing device includes a message routing component configured to receive an original message sent by a sender-user using a sender computing device, the sender computing device and the recipient computing device being coupled together via a communication channel. The recipient computing device also includes a type selection component configured to select a notification type from a set of possible notification types based on at least a portion of the original message, to provide a selected notification type. The recipient computing device also includes a property selection component configured to select one or more property values from one or more respective ranges of possible property values, to provide one or more selected property values. The selected notification type and the selected property value(s) correspond to a recipient-instantiated (RI) notification. The type selection component and/or the property selection component are configured to perform selection using a random generator. The recipient computing device further includes a notification creation component configured to display the RI notification on a user interface presentation on a display device of the recipient-user computing device.

According to a thirteenth aspect (depending from the twelfth aspect), the RI notification is an animated presentation.

According to a fourteenth aspect (depending from the twelfth aspect), a portion of the original message that is used to select the notification type is a static ideogram.

According to a fifteenth aspect (depending from the twelfth aspect), a portion of the original message that is used to select the notification type is a text phrase.

According to a sixteenth aspect, the type selection component is configured to map the portion(s) of the original message to a theme, wherein the set of possible animated items types is associated with the theme.

According to a seventeenth aspect, the type selection component and/or the property selection component are further configured to perform selection based on context information that describes a current context in which the RI notification is to be presented to the recipient-user. The current context relates, at least in part, to characteristics of the recipient-user as specified in a user profile.

According to an eighteenth aspect, a computer-readable storage medium is described for storing computer-readable instructions. The computer-readable instructions, when executed by one or more processor devices, perform a method that includes: receiving, by a recipient computing device, an original message sent by a sender-user using a sender computing device, the sender computing device and the recipient computing device being coupled together via a communication channel; mapping at least a portion of the original message to a theme, the theme being associated with a set of possible notification types; selecting a notification type from the set of possible notification types, to provide a selected notification type; and selecting one or more property values from one or more respective ranges of possible property values, to provide one or more selected property values. The selected notification type and the selected property value(s) correspond to a recipient-instantiated (RI) notification. The selecting of the notification type and/or the selecting of the property value(s) includes random selection. Further, the mapping and/or the selecting of the notification type and/or the selecting of the property value(s) are based on context information that describes a current context in which the RI notification is to be presented to the recipient-user. The method further includes displaying the RI notification on a user interface presentation on a display device of the recipient-user computing device.

According to a nineteenth aspect (depending on the eighteenth aspect), the RI notification is an animated presentation, wherein a portion of the original message that is used to select the notification type is a static ideogram.

According to twentieth aspect (depending on the eighteenth aspect), the RI notification is an animated presentation, and a portion of the original message that is used to select the notification type is a text phrase.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a recipient computing device, an original message sent by a sender computing device, the sender computing device and the recipient computing device being coupled together via a communication channel;
   after receiving the original message, identifying a message theme and a corresponding set of candidate animated notification types based at least upon a natural language phrase that is present in the original message, wherein the candidate animated notification types in the set comprise different graphical depictions of the message theme;
   randomly selecting, by the recipient computing device, a selected animated notification type from the set of candidate animated notification types;
   selecting, by the recipient computing device, one or more property values of a visually perceptible property of the selected animated notification type, to provide one or more selected property values,
   the selected animated notification type and said one or more selected property values corresponding to a personalized recipient-instantiated (RI) notification that represents a computer-generated transformation of the original message sent by the sender computing device; and
   displaying the RI notification on a user interface presentation on a display device of the recipient computing device, the RI notification comprising the selected animated notification type and being shown with the visually perceptible property having the one or more selected property values.

2. The method of claim 1, wherein the randomly selecting comprises using a computer-implemented random number generator to select from among the candidate animated notification types.

3. The method of claim 1, further comprising:
mapping the candidate animated notification types to the message theme and the natural language phrase that is present in the original message; and
mapping other candidate animated notification types to another message theme and another natural language phrase that is present in another original message.

4. The method of claim 1, wherein the natural language phrase appears in the original message as a text phrase.

5. The method of claim 1, wherein the message theme is an affection theme and the candidate animated notification types include:
a first candidate animated notification type depicting a stream of hearts emanating from a source point,
a second candidate animated notification type depicting a beating heart,
a third candidate animated notification type depicting a heart that grows in size, and
a fourth candidate animated notification type depicting an arrow being shot into a heart.

6. The method of claim 1, wherein the randomly selecting of the selected animated notification type and/or the selecting one or more property values is also performed based at least on context information that describes a current context in which the RI notification is to be presented to a recipient-user.

7. The method of claim 6, wherein the current context relates to, at least in part:
a timing at which the RI notification is displayed to the recipient-user; and/or
a location at which the RI notification is displayed to the recipient-user; and/or
a level of importance associated with the RI notification; and/or
an indication of whether the recipient-user is currently interacting with the recipient computing device.

8. The method of claim 1, wherein the user interface presentation includes different user interface portions associated with different respective sender-users, and wherein said displaying involves displaying the RI notification in positional association with a particular user interface portion of the user interface presentation associated with a particular sender-user who sent the original message.

9. The method of claim 1,
wherein the original message is created by a sender-user using a particular application, and
wherein said displaying involves displaying the RI notification without opening the particular application.

10. A recipient computing device, comprising:
a hardware processor; and
a storage resource storing machine-readable instructions which, when executed by the hardware processor, cause the hardware processor to:
receive an original message from a sender computing device, the sender computing device and the recipient computing device being coupled together via a communication channel;
generate a recipient-instantiated (RI) notification by:
after receiving the original message, identifying a message theme and a corresponding set of candidate animated notification types based at least upon a natural language phrase that is present in the original message, wherein the candidate animated notification types in the set comprise different graphical depictions of the message theme;
randomly selecting a selected animated notification type for the RI notification from the set of candidate animated notification types; and
selecting one or more animation property values of an animation property of the selected animated notification type from one or more respective ranges of possible animation property values, to provide one or more selected animation property values; and
display the RI notification on a user interface presentation on a display device of the recipient computing device, the RI notification being displayed with the animation property having the one or more selected animation property values.

11. The recipient computing device of claim 10, wherein the RI notification is an animated emoji.

12. The recipient computing device of claim 10, wherein the selecting the one or more animation property values comprises:
randomly selecting a color of graphical elements presented in the RI notification;
randomly selecting a number of the graphical elements presented in the RI notification;
randomly selecting a type of motion provided in the RI notification;
randomly determining an amount of time for which the RI notification is displayed; and
randomly selecting a size of a window used to display the RI notification.

13. The recipient computing device of claim 10, wherein the machine-readable instructions, when executed by the hardware processor, cause the hardware processor to:
select at least one of the selected animated notification type or the one or more selected animation property values of the animation property based at least on context information that describes a current context in which the RI notification is to be presented to a recipient-user,
wherein the current context relates, at least in part, to characteristics of the recipient-user as specified in a user profile.

14. A computer-readable storage medium storing computer-readable instructions, the computer-readable instructions, when executed by one or more processor devices, causing the one or more processor devices to perform acts comprising:
receiving an original message;
after receiving the original message, identifying a message theme and a corresponding set of candidate animated notification types based at least upon a natural language phrase that is present in the original message, wherein the candidate animated notification types in the set comprise different graphical depictions of the message theme and each candidate animated notification type includes a corresponding set of randomly-variable animation properties;
randomly selecting a particular animated notification type from the set of candidate animated notification types associated with the message theme, to provide a randomly selected animated notification type;
randomly selecting one or more animation property values from one or more respective ranges of possible animation property values for a particular animation property of the randomly selected animated notification type, to provide one or more randomly selected animation property values; and
presenting an animated notification of the randomly selected animated notification type, the animated notification having the one or more randomly selected animation property values for the particular animation property.

15. The computer-readable storage medium of claim 14, wherein the one or more randomly selected animation property values include at least one randomly selected animation property value that controls movement of the animated notification.

16. The computer-readable storage medium of claim 14, wherein the animated notification includes one or more hearts, and randomly selecting the one or more animation property values comprises:
   randomly selecting a number of hearts to present in the animated notification;
   randomly selecting a color of the one or more hearts from a plurality of possible colors for the one or more hearts;
   randomly selecting a type of motion of the one or more hearts from a plurality of possible motion types for the one or more hearts;
   randomly selecting an amount of time that the one or more hearts are displayed; and
   randomly selecting a size of a window used to display the one or more hearts.

17. The computer-readable storage medium of claim 14, the acts further comprising:
   accessing context information for a recipient-user that is designated to receive the animated notification, the context information conveying at least:
      a user profile that conveys a relationship between the recipient-user and a sender-user of the original message,
      a timing at which the animated notification is to be displayed to the recipient-user, and
      a location at which the animated notification is to be displayed to the recipient-user; and
   utilizing the context information in conjunction with a randomly-generated number to select the particular animated notification type.

18. The computer-readable storage medium of claim 17, wherein the utilizing comprises:
   selecting the set of candidate animated notification types from a larger set of animated notification types based at least on the context information; and
   after selecting the candidate animated notification types based at least on the context information, using the randomly-generated number to select the randomly selected animated notification type from the set of candidate animated notification types.

19. The computer-readable storage medium of claim 17, wherein the utilizing comprises:
   biasing each of candidate animated notification types based at least on the context information; and
   using the randomly-generated number to select from the biased candidate animated notification types.

20. The computer-readable storage medium of claim 17, wherein the utilizing comprises:
   using a machine-trained model to map a feature vector into a corresponding score for each candidate animated notification type in the set,
   wherein the feature vector incorporates one or more first features reflecting the context information and one or more second features reflecting the randomly-generated number.

* * * * *